Oct. 18, 1932. J. F. HAAS 1,883,728
PORTABLE POWER DRIVEN THREADING MACHINE
Filed April 26, 1930
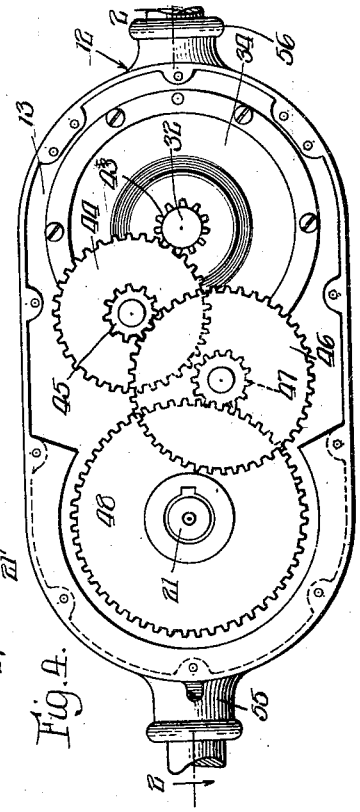
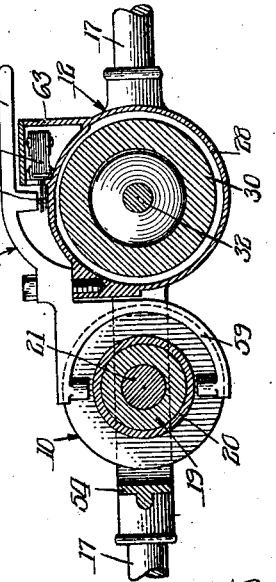
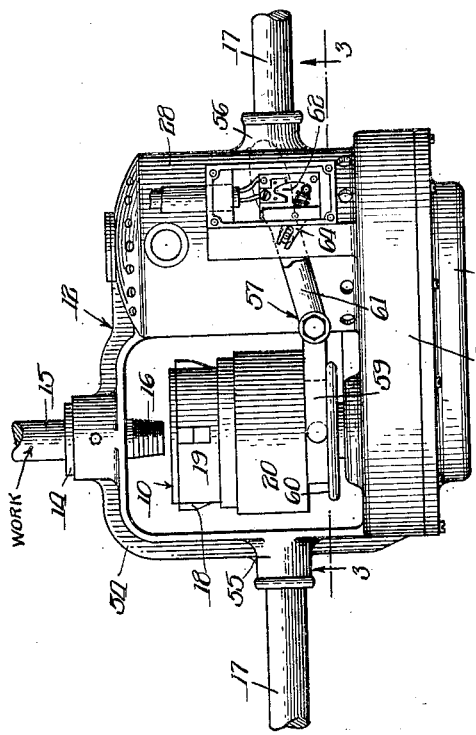
Inventor:
Joseph F. Haas,
By Chindahl Parker Rinken
Attys.

Patented Oct. 18, 1932

1,883,728

UNITED STATES PATENT OFFICE

JOSEPH F. HAAS, OF FOREST PARK, ILLINOIS, ASSIGNOR TO WODACK ELECTRIC TOOL CORPORATION, OF CHICAGO, ILLINOIS, A CORPORATION OF ILLINOIS

PORTABLE POWER DRIVEN THREADING MACHINE

Application filed April 26, 1930. Serial No. 447,486.

The invention relates generally to portable power-driven threading machines, and an important object of the invention is to provide a novel and effectual machine of this type which is capable of performing the threading operation rapidly and with a minimum of effort on the part of the operator.

Another object is to provide in a portable threading machine embodying a threading tool having movable cutting members and an electric driving motor, a unitary control device arranged to operate both the cutting members of the tool and the motor switch.

A further object is to provide a portable electric threading machine having an automatically operable die and a motor control switch operatively associated therewith so as to stop the motor automatically upon the completion of the threading operation.

Another object is to provide a new and improved machine of this character which is self-contained and embodies a threading tool, a driving motor and intermediate speed reduction gearing arranged in a novel manner with respect to each other, whereby to produce an unusually compact, rugged and easily manipulated tool.

Another object is to provide such a tool in which the parts are arranged for convenient assembly and disassembly for the purpose of inspection or repair.

The above and other objects are attained through the provision of a device having a rotatably mounted threading tool and a driving motor both mounted on the same supporting structure, the tool being of the self-opening type whereby to render reverse rotation of the tool unnecessary. Speed reduction gearing interposed between the motor and the tool is arranged to rotate the tool in one direction, and a switch for controlling the motor interlocked with one of the shiftable members of the threading tool in such a manner that the switch will be closed when the cutters of the tool are in their operative positions and will be opened when the cutters are moved to their inoperative positions.

Other objects and advantages will become apparent from the following description taken in connection with the accompanying drawing, in which:

Fig. 1 is a plan view of a portable threading machine embodying the invention in its preferred form.

Fig. 2 is an enlarged sectional view of the machine taken along the line 2—2 of Fig. 4.

Fig. 3 is a sectional view taken along the line 3—3 of Fig. 1.

Fig. 4 shows the machine as viewed from the bottom in Fig. 2 with the cover of the gear box removed.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

As herein illustrated, the invention is embodied in a portable threading machine having a rotatable threading tool 10, and a driving motor 11 (Fig. 2) therefor, disposed side by side on a rigid supporting structure 12 in close proximity to each other and drivingly connected by gearing disposed along corresponding ends of the motor and the tool in a gear box 13 formed on the supporting structure 12. The structure 12 also carries a guide 14 located on the side of the structure opposite from the gear box 13 and adapted to engage a piece of work such as a fixedly supported pipe 15 to insure proper operation of the threading tool upon the pipe and assist in supporting the weight of the machine while the threading tool cuts a thread 16 on the end of the pipe. The tool may be lifted into position and manipulated during the threading operation by means of a pair of alined handles 17, fixed in the supporting structure 12 and projecting in opposite directions from the sides thereof.

The threading tool 10 herein shown is a self-opening die of a well known character wherein radially movable cutters 18 mounted in one end of a rotatable body 19 are moved inwardly of the body to operative position by a sleeve 20 slidable longitudinally of the body, and are automatically retracted by means not herein shown after they have formed a predetermined length of thread on the work, the sleeve 20 being returned to its initial or inoperative position, shown in Fig. 1, as an incident to the retraction of the cutters 18. The tool 10 is supported and rotated by a shaft 21 rotatably mounted in the gear box 13 and having one end projecting through a fixed wall 23 (Fig. 2) of the gear box, the projecting end of the shaft being screw threaded into the body 19 of the tool as indicated at 24 in Fig. 2. A ball bearing 25 mounted in the wall 23 serves to rotatably support one end of the shaft 21 while the other end of the shaft is supported in a ball bearing 26 mounted in a recess formed in a detachable cover 27 secured on the gear box parallel to the wall 23.

In the present case the motor 11 is mounted in a housing 28 which constitutes a part of the supporting structure 12 and is cast integral with one side of the gear box adjacent to one end thereof. An opening 29 (Fig. 2) is provided in the wall 23 to permit the motor 11 to be inserted into the housing 28 when the cover 27 has been removed. The stator 30 of the motor is fixed in the housing 28 by any preferred means (not shown) with the axis thereof parallel to the axis of the tool 10, while the rotor 31 of the motor is mounted with one end of the motor shaft 32 in a ball bearing 33 positioned in a recess at the closed end of the housing 28. The other end of the motor shaft 32 is rotatably mounted in and projects through a removable plate 34 extending across the opening 29 and forming a part of the gear box. A ball bearing 35 supports the shaft in the plate 34.

Between the plate 34 and the rotor, the shaft 32 carries a fan 36 operable to draw air into the casing to holes 37 in the end of the casing and to expel the air through holes 38 in the periphery of the housing 28 opposite the ends of the fan blades. A ring 39 positioned in the opening 29 between the stator 30 and the fan 36 serves to define an intake opening for the fan and insures that all of the air drawn through the fan will pass through the space between the rotor and the stator.

On the projecting end of the motor shaft 32 within the gear box 13 is a gear 43 arranged to drive the tool shaft 21 through suitable speed reduction gearing consisting of gears 43, 44, 45, 46, 47, and 48, all mounted within the gear box 13 and the gear 48 being carried by the tool shaft 21. Thus, the tool 10 may be driven in one direction at a relatively low speed by means of the motor 11.

The guide 14 which engages the work 15 during the threading operation is preferably in the form of a bushing, as shown in Fig. 2, detachably secured in an angular frame 54 which forms a part of the supporting structure 12 and in the present case is cast integrally therewith. The frame 54 is secured at one end to the closed or projecting end of the motor housing 28 and extends transversely across the end of the tool 10 in spaced relation thereto and parallel to the wall 23 of the gear housing. The frame 54 extends beyond the side of the tool 10 and then along the side of the threading tool parallel to the axis of the tool and is attached to the end of the wall 23 of the gear box. The portion of the frame 54 which is parallel to the tool axis has a boss 55 thereon into which one of the handles 17 is threaded so as to be perpendicular to the axis of the threading tool 10 and in a plane passing through the axis of the tool and the motor. The other handle 17 is threaded into a boss 56 formed on the motor housing 28.

As above pointed out, the tool 10 has a sleeve 20 for shifting the cutters 18 to their operative positions, and for the purpose of moving the sleeve 20, a control lever 57 is pivotally mounted on the motor housing 28 and has a yoke 59 engaging an annular groove 60 formed in the sleeve 20. By moving the arm 61 of the lever toward the gear box 13 the cutters 18 are moved to their operative positions. A motor switch 62 mounted within a casing 63 on the motor housing is interlocked with the control lever 57 and as herein shown the switch 62 is of the well known toggle type having an operating arm 64 projecting from the casing 63. This operating arm 64 is connected to the control lever 57 by means of a longitudinal slot formed in the arm 63 and engaging a pin 66 mounted on a control lever 57, as shown in Figs. 1 and 3. Thus, when the control lever 57 is shifted in a clockwise direction (Fig. 1) to move the cutters 18 to their operative positions the operating arm 64 of the switch will be moved to close the switch 62 and start the motor. This construction insures that the cutters will always be in their operative positions when the tool is applied to a piece of work. When the sleeve 20 is automatically released upon completion of the threading operation and is moved away from the cutters to its initial or inoperative position, (shown in Fig. 1) the control lever 57 will be correspondingly shifted and the switch 62 would be opened so as to stop the motor.

It will be apparent that by employing a self-opening threading tool in a machine of this character, the invention has provided a machine which may be removed quickly from the work as soon as the cutting operation has been completed thereby saving time for the operator. The use of such a threading tool also makes possible the use of a light set of gears and consequently the workman is able to manipulate the machine more easily than prior machines of this general type.

The arrangement of the various elements of the machine is also of advantage since these elements are disposed relatively close to the axis of the threading tool and the guide and the machine may therefore be easily supported and manipulated during the threading operation. It will be apparent that the manipulation of the tool may be accomplished with comparative ease since the workman, after closing the motor switch and the die by means of the lever 57, may lift the entire structure by means of the two handles 17 and may position the structure with the flat surface of the gear box cover 27 against his body so that the entire structure may be easily guided until the tool 10 engages the work. The interlocked arrangement of the motor and the collapsible threading tool also contributes to the efficient operation of the machine since it eliminates loss of time which might result from the application of the tool to the work with the cutters in their inoperative positions.

I claim as my invention:

1. A portable threading machine comprising a supporting structure having an elongated flat gear box, a motor housing carried by said gear box at one end thereof and projecting perpendicularly from the box, an angular frame extending from the projecting end of said housing and connected to the other end of said gear box, a threading tool rotatably supported in the space between said frame and said gear box and said motor housing, a guide supported by said frame in coaxial relation to said tool, a motor in said housing, speed reduction gearing in said gear box connecting said motor to said threading tool, and a pair of alined handles, one mounted on said angular frame and the other mounted on said motor housing.

2. A portable threading machine comprising a supporting structure having a gear box, a motor housing at one end of said gear box projecting perpendicularly therefrom, an angular frame extending from the projecting end of the motor housing and connected to the other end of said gear box, a threading tool rotatably supported in the space between said frame and said gear box and motor housing, a guide supported by said frame coaxially with said tool, a motor in said housing and speed reduction gearing in said gear box connecting said motor to said threading tool.

3. A portable threading machine of the character described comprising, in combination, a supporting structure, a threading tool rotatably mounted on said supporting structure, said tool having cutters movable between operative and inoperative positions, a motor mounted on said structure and having a driving connection with said threading tool, a switch for said motor mounted on said structure, and means for moving said cutters from one of said positions to the other and simultaneously operating said motor switch.

4. A portable threading machine comprising a supporting structure, a self-opening threading tool rotatably mounted on said supporting structure, said tool having cutters movable between operative and inoperative positions and arranged to move automatically from their operative to inoperative positions when a predetermined length of thread has been formed on a piece of work, a motor mounted on said structure and having a driving connection with said threading tool, a switch for said motor mounted on said structure, a handle mounted on said structure operable when moved in one direction to move said cutters to their operative positions, said handle being moved in the other direction when said cutters move from their operative to inoperative positions, and means forming a connection between said handle and said switch operable to close said switch when said handle is actuated to move said cutters to their operative positions and to open said switch when said handle is moved in said other direction.

In testimony whereof, I have hereunto affixed my signature.

JOSEPH F. HAAS.